Sept. 7, 1965 L. A. NIX, JR 3,205,377

RASTER LINEARITY CORRECTION GENERATOR

Filed July 10, 1963 4 Sheets-Sheet 1

INVENTOR.
LAWRENCE A. NIX, JR.

BY

ATTORNEYS

INVENTOR.
LAWRENCE A. NIX, JR.
BY
ATTORNEYS

Sept. 7, 1965 L. A. NIX, JR 3,205,377

RASTER LINEARITY CORRECTION GENERATOR

Filed July 10, 1963 4 Sheets-Sheet 3

INVENTOR.
LAWRENCE A. NIX, JR.

BY

Paul L. Gritchfield
ATTORNEYS

INVENTOR.
LAWRENCE A. NIX, JR.
BY
ATTORNEYS

United States Patent Office 3,205,377

Patented Sept. 7, 1965

3,205,377

RASTER LINEARITY CORRECTION GENERATOR

Lawrence A. Nix, Jr., Ellicott City, Md., assignor, by mesne assignments, to the United States of America as represented by the Secretary of the Navy Filed July 10, 1963, Ser. No. 294,208
5 Claims. (Cl. 307—88.5)

The present invention relates to a raster linearity correction generator, and more particularly to a raster linearity correction generator in which each sweep axis is corrected for its own non-linearity and for non-linearity introduced by the other axis sweep.

The prior art raster generators result in a non-linearity due to the geometry of the deflection area between the deflection elements and the face of the cathode ray tube. This is because of the fact that in flat-faced cathode ray tubes the beam deflection starting at the axis of the tube results in further travel of the beam for wide angles of deflection than angles of deflection near the center of the cathode ray tube. This distortion is equally true for the $x$ axis deflection, i.e., horizontal axis, as for the $y$ axis deflection, i.e., vertical axis.

Prior art attempts to correct this distortion have resulted in systems whereby the $x$ or horizontal sweep is coupled into a matrix of bias diodes which introduce distortion in the sawtooth waveform to compensate for the geometric distortion suffered in the cathode ray tube deflection system. It has been found that in the case of $x$ axis correction the $y$ axis sweep introduces further distortion in the $x$ axis sweep so the $y$ axis sweep waveform has been coupled into the $x$ axis correction matrix for controlling to a limited degree the amount of correction of the network.

It has been found, however, that the $y$ axis correction to the $x$ axis correction matrix as outlined above is insufficient due to the effect that the $x$ axis sweep has on the $y$ axis sweep that is utilized for $x$ axis correction. Thus, to complete the correction network, the present invention incorporates some of the uncorrected $x$ axis sweep into the $y$ axis correction to the $x$ axis correction matrix. This philosophy is utilized on the $y$ axis correction matrix for complete compensation in both axes sweep voltages or currents, for the effects of cathode ray tube deflection geometry on the linearity of a raster comprising two ramp functions, one applied to each axes.

In this application the term raster is defined as the result of a combination of ramp functions applied to the vertical, i.e., $y$ axis and horizontal, i.e., $x$ axis deflection systems of a cathode ray tube. To accomplish the linearity correction as outlined above the present invention utilizes four biased diode matrices together with a combining network. The main $x$ axis correction matrix in this application will be referred to as the $x$-on axis matrix and the main $y$ axis correction matrix will be referred to as the $y$-on axis matrix. The other two matrices, i.e., the ones associated with the $x$-on axis matrix and the $y$-on matrix will be referred to as the $y$-off axis matrix and the $x$-off axis matrix, respectively. Hence, in the $x$ axis corrective network the $x$-on axis matrix is supplied with the uncorrected $x$ axis sweep voltage and is controlled in part by the $y$-off axis corrective matrix. The $y$-off axis matrix has as its input the uncorrected $x$ axis sweep voltage and the uncorrected $y$ axis sweep voltage. Likewise in the $y$ axis channel the uncorrected $y$ axis sweep voltage is supplied to the main $y$-on axis matrix which is controlled by the $x$-off axis matrix which in turn is supplied with inputs of the uncorrected $x$ axis and the uncorrected $y$ axis sweep voltages. As will be seen below, the $y$-off axis matrix and the $x$-off axis matrix are combined in a combining network having two outputs, one controlling each on-axis matrix.

It is thus an object of the present invention to provide an improved linearity correction generator which will correct for non-linearity introduced in wide angle flat-faced cathode ray tube deflection systems.

Another object is the provision of a raster linearity correction generator in which each axis is corrected for non-linearity introduced by the other axis sweep.

A further object of the present invention is to provide a raster linearity correction generator in which the off-axes correction is further corrected by the on-axes sweep.

Still another object is to provide an improved raster linearity correction generator which is inexpensive, relatively simple and requires a minimum of maintenance and adjustment.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
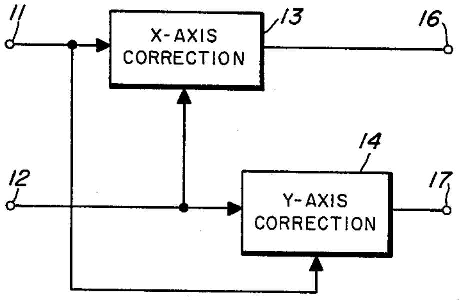
FIG. 1 (PRIOR ART)
FIG. 1 is a system block diagram of a prior art correction generator.
Figure 2:
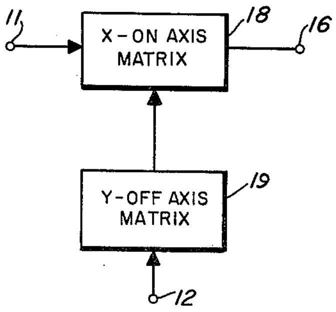
FIG. 2 (PRIOR ART)
FIG. 2 is a partial breakdown of one of the blocks of FIG. 1.

Referring to the drawings and more particularly to FIGS. 1 and 2, input terminals 11 and 12 are connected to the $x$ and $y$ axes correction matrices 13 and 14. The $x$-axis matrix has output terminal 16 and the $y$ axis matrix has output terminal 17. In FIG. 2 the $x$ axis matrix has been divided showing an $x$-on axis matrix 18 with input terminal 11 connected to the input thereto, and the $y$-off axis matrix 19 having input terminal 12, the output of which is connected to $x$-on axis matrix 18. The $x$-on axis matrix has output terminal 16.

Figure 3:
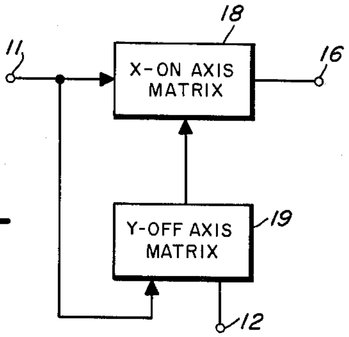
FIG. 3 is a system block diagram of one channel of the linearity correction generator of the present invention.

Referring to FIG. 3, the input terminal 11 is connected to $x$-on axis matrix 18 and $y$-off axis matrix 19. Input terminal 12 is connected to $y$-off axis matrix 19, the output of which is connected to the $x$-on axis matrix 18. The $x$-on axis matrix 18 has output terminal 16.

Figure 4:
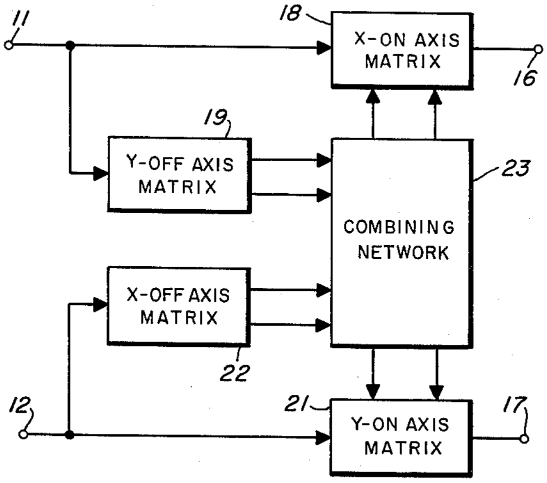
FIG. 4 is a more detailed block diagram of the system of the present invention.
Figure 5:
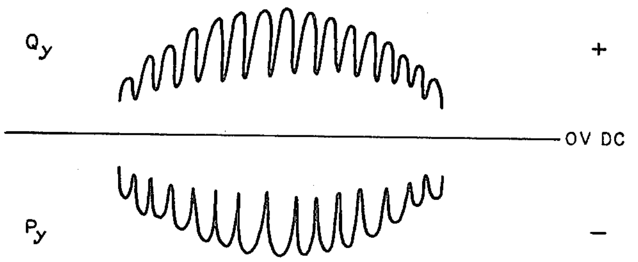
FIG. 5 shows voltage waveforms to points of FIGS. 4, 7, and 9.

Referring to FIG. 4, input terminal 11 is connected to $x$-on axis matrix 18 and $y$-off axis matrix 19. Input terminal 12 is connected to $y$-on axis matrix 21 and $x$-off axis matrix 22. The outputs of the off-axis matrices 19 and 22 are connected to combining network 23. The outputs of combining network 23 are connected to $x$-on axis matrix 18 and $y$-on axis matrix 21. The output of $x$-on axis matrix 18 is connected to output terminal 16 and the output of $y$-on axis matrix 21 is connected to output terminal 17.

Figure 7:
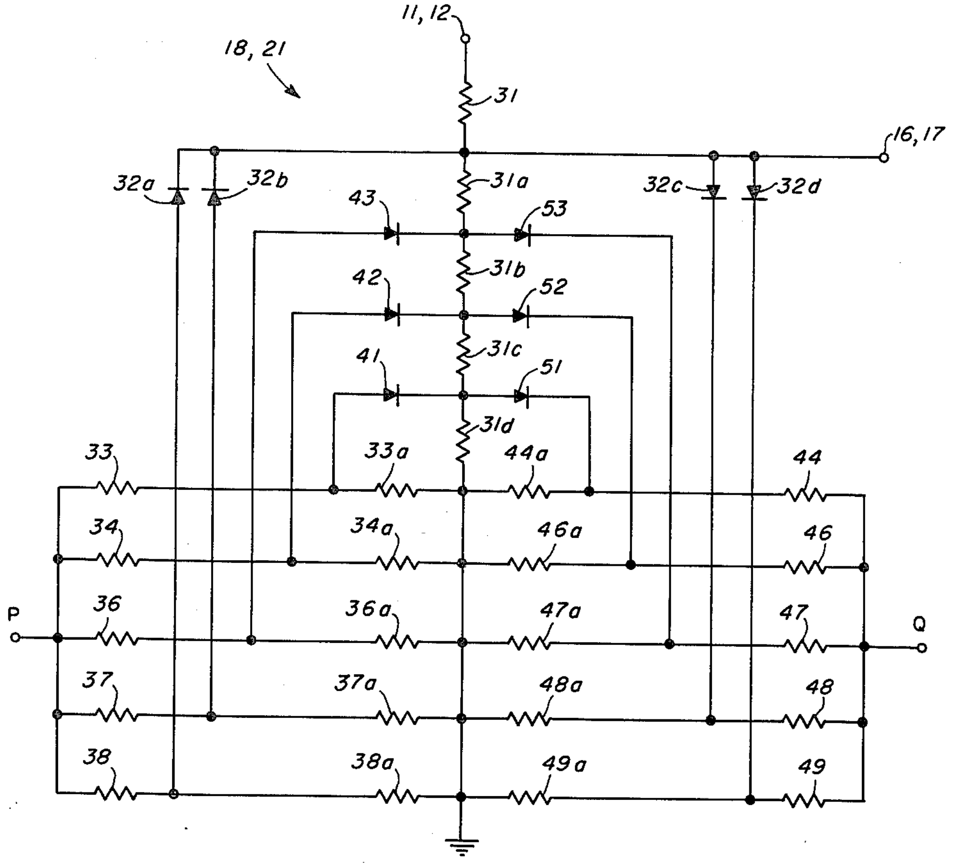
FIG. 7 shows in schematic form the on axis matrix of FIG. 4 for either axis.

Referring to FIG. 7, the on-axis correction matrix of either the $x$ or $y$ channel is shown. Hence, the input terminal shown at 11, 12 can be either input terminal 11 or 12. There are two of these matrices for a complete embodiment of the present invention and since they are identical only one is shown. Between input terminal 11, 12 and ground are shown resistances 31, 31a, 31b, 32d, 31c and 31d in series. The junction between resistances 31 and 31a is connected to output terminal 16, 17 and to one side of rectifiers 32a, 32b, 32c and 32d. Input terminal p is connected through serial resistance pairs 33, 33a; 34, 34a; 36, 36a; 37, 37a; and 38, 38a to ground. The junctions of these pairs are connected to rectifiers 41, 42, 43, 32b and 32a, respectively. Input terminal Q is connected through serial resistance pairs 44, 44a; 46, 46a; 47, 47a; 48, 48a; and 49, 49a to ground and the junctions of these resistance pairs are connected to rectifiers 51, 52, 53, 32c and 32d, respectively.

Figure 8:
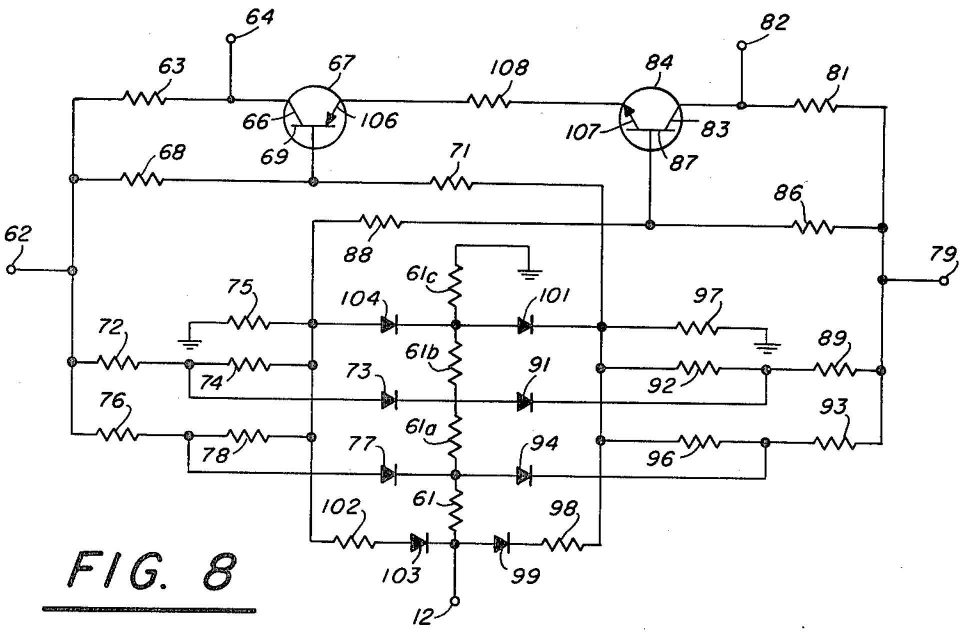
FIG. 8 shows the schematic diagram for the $x$-off axis matrix of FIG. 4.

Referring to FIG. 8, input terminal 12 is connected through resistances 61, 61a, 61b, and 61c in series to ground. Negative terminal 62 is connected through resistance 63 to output terminal 64 and collector 66 of transistor 67; through resistance 68 to base 69 of transistor 67 and to resistance 71; through resistance 72 to diode 73 and resistance 74; and through resistance 76 to diode 77 and resistance 78. Positive terminal 79 is connected through resistance 81 to output terminal 82 and to collector 83 of transistor 84; through resistance 86 to base 87 of transistor 84 and resistance 88; through resistance 89 to diode 91 and resistance 92; and through resistance 93 to diode 94 and resistance 96. The other ends of resistances 92 and 96 are connected together and through resistance 97 to ground; through resistance 98 to diode 99; to diode 101; and to the other side of resistance 71. The other side of resistances 74 and 78 are connected together and through resistance 75 to ground; through resistance 102 to diode 103; to diode 104; and to resistance 88. The input terminal 12 is also connected to diodes 99 and 103. The junction of resistances 61 and 61a is connected to diodes 77 and 94; the junction of resistances 61a and 61b is connected to diodes 73 and 91 and the junction of resistances 61b and 61c is connected to diodes 104 and 101. Emitters 106 and 107 of transistors 67 and 84, respectively, are connected to opposite ends of resistance 108.

Figure 9:
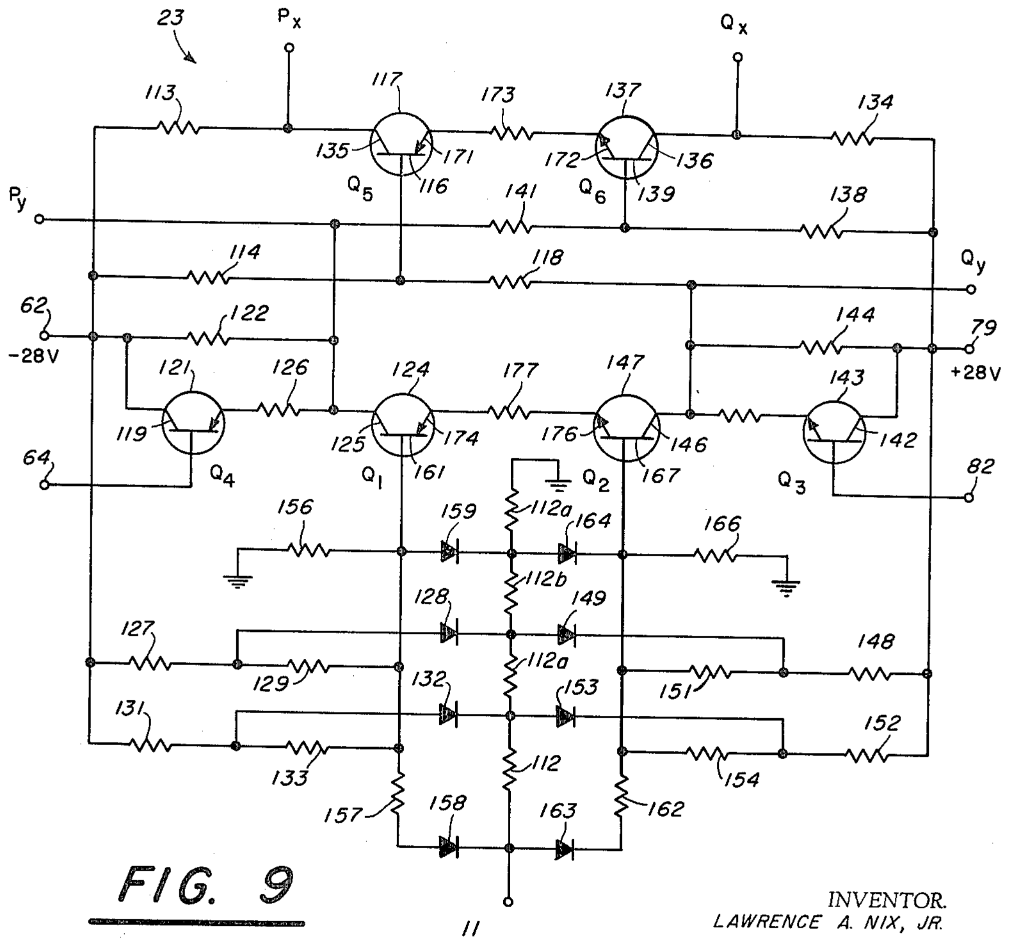
FIG. 9 shows the schematic representation of the $y$-off axis matrix and the combining network of FIG. 4.

Referring to FIG. 9, input terminal 11 is connected through resistances 112, 112a, 112b and 112c in series to ground. Negative terminal 62 is connected through resistance 113 to output terminal $p_x$; and through resistance 114 to base 116 of transistor 117 and to resistance 118; to collector 119 of transistor 121; through resistance 122 to collector 123 of transistor 124 and to resistance 126; through resistance 127 to diode 128 and resistance 129; and through resistance 131 to diode 132 and resistance 133.

Positive terminal 79 is connected through resistance 134 to output terminal $Q_x$ and collector 136 of transistor 137; through resistance 138 to base 139 of transistor 137 and to resistance 141; to collector 142 of transistor 143; through resistance 144 to output terminal $Q_y$ and resistance 118 and collector 146 of transistor 147; through resistance 148 to diode 149 and resistance 151; and through resistance 152 to diode 153 and resistance 154. The other side of resistances 129 and 133 are connected together and through resistance 156 to ground; through resistance 157 to diode 158; to diode 159; and to base 161 of transistor 124. The other side of resistances 151 and 154 are connected together and through resistance 162 to diode 163; to diode 164; through resistance 166 to ground; and to base 167 of transistor 147. Emitters 171 and 172 of transistors 117 and 137, respectively, are connected together through resistance 173. Emitters 174 and 176 of transistors 124 and 147, respectively, are connected together through resistance 177.

*Operation*

Figure 10:
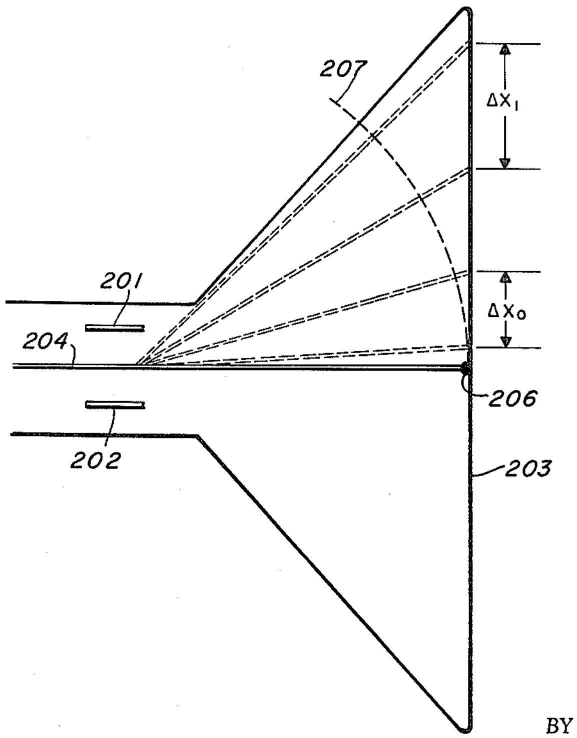
FIG. 10 is a graphic representation of cathode ray tube deflection distortion.

Referring to FIG. 10, the type of distortion which is corrected by the instant invention is depicted graphically. Shown schematically are deflection plates 201 and 202 of a wide angle deflection flat-faced cathode ray tube with the screen or face of the tube shown at 203. An electron beam 204 coming into the deflection area, if allowed to pass through the deflection area without an electro-static field acting thereon, will impinge upon the screen 203 of the tube at point 206. If, however, the beam is deflected upward by a given deflection voltage increment it will move up by an amount shown as $\Delta x_0$. As the beam is further deflected by increments of the same deflection voltage change the amount of deflection on the tube becomes more and more as shown by $\Delta x_1$. This is because of the fact that the deflection is a radial increment along the curve shown by dotted line 207 and will deflect an equal increment along this circumference by a given increment of radial deflection. However, when allowed to continue radially from the deflection point between deflection plates 201 and 202, a larger increment of deflection is shown on the face 203 of the cathode ray tube. This is illustrated by increment $\Delta x_1$. It is apparent that as the angle of deflection increases, a truly linear ramp function sweep waveform must be compensated to effect a linear deflection sensitivity throughout the face of the cathode ray tube. It is also apparent that as the beam is moved laterally between any of the two deflection elements, i.e., the opposite axis deflection, the beam will move into an area of higher deflection sensitivity which has the reverse effect on the deflection linearity and hence must be also compensated for for a truly linear system.

Referring back to FIG. 1, a prior art system is shown wherein the uncorrected linear ramp function is applied at input terminal 11 for the $x$ or horizontal axis, and the uncorrected linear ramp function sweep voltage for the $y$ or vertical axis is applied at input terminal 12. This system would be for a raster type display such as commonly used in television. To compensate the $x$ axis waveform for cathode ray tube geometry non-linearity, the uncorrected ramp function is applied to the $x$ axis correction matrix 13 with its output taken at output terminal 16 to the deflection amplifier or directly to the deflection plates. To compensate for the off-axis or vertical movement of the beam in the deflection system, an input is also taken from the $y$ axis ramp function from terminal 12, and applied to the $x$ axis compensating matrix 13. This compensates for off-axis movement through the $x$ deflection system and the resulting cathode ray tube geometry non-linearity discussed above. The $y$ axis compensating system is identical and is shown at 14 with one input taken from the $y$ ramp function input terminal 12 and another input taken from the $x$ ramp function input terminal 11. The output for the $y$ axis deflection is taken at output terminal 17.

Referring to FIG. 2, the $x$ axis compensating system 13 is broken up into two blocks showing an on-axis matrix 18 and an off-axis matrix 19. The uncorrected $y$ ramp function is coupled to the off-axis matrix 19, resulting in a correction voltage at one input of the on-axis matrix 18. The uncorrected $x$ function comes into another input of the on-axis matrix 18, the output again being taken at output terminal 16. While this system has enjoyed limited success it has been found that on extremely wide angle deflection systems of cathode ray tubes, non-linearity of a high order is still present.

The block diagram of FIG. 3 shows another input to the off-axis matrix 19 from input terminal 11, i.e., since lateral movement between the horizontal plates in this case would create distortion which is off-set by an input from the $y$ axis sweep as shown in FIGS. 1, 2 and 3 the horizontal movement likewise varies the deflection sensitivity of the vertical deflection system. Hence, a second compensating voltage must be coupled into the off-axis matrix to off-set this distortion. Naturally, another system identical to the one shown in FIG. 3 must be present for the $y$ axis, so it is necessary to have an $x$-on axis matrix, an $x$-off axis matrix, a $y$-on axis matrix, and a $y$-off axis matrix. Each of the on-axis matrices is fed by its axes ramp function and by the other off-axis matrix and each off-axis matrix must be varied in accordance with the ramp functions of both axes.

Referring to FIG. 4, a more complete system block is shown incorporating the principles of FIG. 3. The horizontal ramp function at input terminal 11 is coupled to the $x$-on axis matrix 18 and the $y$-off axis matrix 19. The vertical ramp function at input terminal 12 is coupled to the $y$-on axis matrix and the $x$-off axis matrix 22. The outputs of the off-axis matrices 19 and 22 are both coupled to combining network 23 in which a combined signal of the $x$ and $y$ axes is coupled to the $x$ and $y$-on axes matrix compensating networks 18 and 21, respectively. The outputs to the deflection system of the cathode ray tube are taken at output terminals 16 and 17. Hence, in practice instead of coupling each ramp function to each off axes matrix as indicated by simplified block in FIG. 3 the two effects are combined in a combining network 23.

Figure 6:
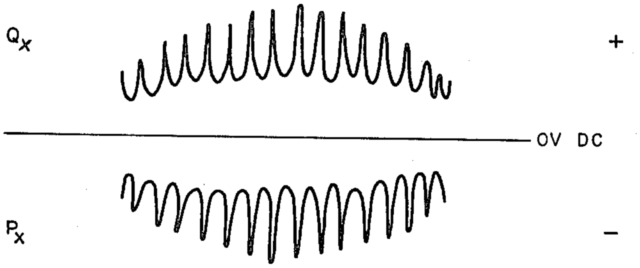
FIG. 6 shows a pair of voltage waveforms at two points of FIGS. 4, 7, and 9.

FIG. 6 shows the input to the $y$-on axis matrix 21 from combining network 23 and FIG. 6 shows the input to the $x$-on axis matrix 18 from combining network 23. These figures are representative and would be the result of a typical television type raster. Each waveform has the same time base.

FIG. 7 is a schematic representation of the on-axis matrix 18 and 21; since they are identical only one schematic is shown. An uncompensated linear ramp function is presented at input terminal 11, 12 (depending on whether it is the $x$ or $y$ input). Points $p$ and $q$ represent inputs from combining network 23 and for the purposes of discussing FIG. 7, it will be assumed that they are a steady symmetrical D.C. potential, i.e., a negative potential at $p$ and a positive potential at $q$. Hence, the dividing network comprising resistances 33, 33$a$, 34, 34$a$, 36, 36$a$, 37, 37$a$, 38, 38$a$ serves to bias diodes 41, 42, 43, 32$b$ and 32$a$, respectively. The voltage dividers comprising resistances 44, 44$a$, 46, 46$a$, 47, 47$a$, 48, 48$a$, 49, 49$a$ serves to bias diodes 53, 52, 51, 32$c$ and 32$d$, respectively. Assuming a ramp function voltage applied at input terminals 11, 12, which is symmetrical about the zero axis, diodes 41, 42, 43, 32$a$ and 32$b$ will all be conducting due to the extreme negative starting signal. As the signal at terminals 11, 12 rises toward zero, diode 41 will first cut off, followed by diode 42, diode 43, diode 32$b$, and diode 32$a$ as the waveform closely approaches the zero D.C. level. On the other half of the cycle, as the waveform goes positive, diode 32$d$ will first conduct as its bias is overcome, followed by diode 32$c$, diode 53, diode 52, and diode 51 until, at the most positive part of the cycle, all of the positively biased diodes are conducting. This matrix, with proper biasing of the diodes for a given input ramp function, will then serve to correct for non-linearity due to cathode tube deflection geometry with no off axes deflection, i.e., deflection in the other axes 90° to the one being corrected. However, as pointed out above it becomes necessary to correct for the off axes deflection and this correction is applied at points $p$ and $q$ of FIG. 7. This will serve to introduce a bias to the diodes which will vary with the deflection voltage of the opposite axis and hence compensate for deflection distortion otherwise created.

Referring to FIG. 8, the $x$ channel off-axis matrix in schematic form is shown, which corresponds to block 22 of FIG. 4. Input terminal 12 supplies the $y$ channel ramp function to the system with outputs taken at terminals 64 and 82. Here, as in the matrix of FIG. 7, there is a voltage divider network between ground and input terminal 12 comprising resistances 61, 61$a$, 61$b$ and 61$c$. A negative divider network is placed between negative terminal 62 and ground through resistances 72, 74 and 75 and resistances 76, 78, and 75. These dividers serve to bias the anodes of diodes 104, 73 and 77 whereas the first divider network comprising resistances 61, 61$a$, 61$b$ and 61$c$ set the amount of input waveform applied to the cathodes of diodes 77, 73 and 104. The positive terminal is likewise connected to a voltage divider network comprising resistances 97, 92, 89 and resistances 97, 96 and 93. This supplies a positive bias to the cathodes of diodes 101, 91 and 94, the anodes being tied in to the input signal divider network comprising resistances 61, 61$a$, 61$b$ and 61$c$. A further division is accomplished through two networks comprising resistance 12 and diode 103 and diode 99 and resistance 98. Again, assuming a symmetrical ramp function about zero axis, as the input ramp function begins in its most negative potential, all of the negatively biased diodes 104, 73, 77 and 103 will conduct. As the ramp function approaches zero diode 104 will first cut off followed by diodes 73, 77 and 103. This serves to compensate or supply a compensated $y$ ramp function to base 87 of transistor 84. On the positive half cycle all of the positively biased diodes 101, 91, 94 and 99 are cut off at zero or the beginning of the positive half cycle. As the cycle progresses in a positive direction diode 99 begins conducting followed by diode 94, 91 and finally diode 101. Hence, around the zero axis for the $y$ input or the $x$ channel off axis matrix, no $y$ signal is seen at outputs 64 and 82 since all of the diodes in the off channel matrix are cut off. This is desirable in that with no off-axis deflection, no correction to the on-axis correction matrix is needed. At the extremes of off-axis deflection, maximum correction is applied at bases 69 and 87 of complementary-symmetry transistors 67 and 84 resulting in maximum correction output signal from output terminals 64 and 82.

Referring now to FIG. 9, the blocks of FIG. 4 designated as combining network 23 and $y$ off-axis matrix 19 are combined in schematic form. As in the $x$ off-axis matrix of FIG. 8, the ramp function from the off-axis is applied at input terminal 11. This is the horizontal or $x$ uncorrected or uncompensated input waveform. Assuming again a negative-to-positive waveform symmetrical about the zero axis, all of the negatively biased diodes 159, 128, 132 and 158 will be conducting. As the ramp function becomes less negative and approaches zero, diode 159 will cut-off followed by diodes 128, 132 and 158, to decrease compensation when there is no off-axis, or $x$ axis in this case, deflection. At zero, none of the diodes are conducting and no compensation from the off axis is present or desirable. As the waveform goes positive, diode 163 begins conducting first, supplying a small amount of compensation to base 167 of transistor 147, followed by diodes 153, 149 and 164 going into conduction and supplying more and more corrective voltage to base 167 of transistor 147. Again, transistors 124 and 147 are connected in a complementary-symmetry configuration resulting in a push-pull output at terminals $p_y$ and $q_y$.

The outputs of the $x$ off-axis matrix shown in FIG. 7 at terminals 64 and 82 are applied to terminals 64 and 82 of FIG. 9 to the bases of transistors 121 and 143. These are connected in the same conductivity relationship and are in the collector circuits of transistors 124 and 147, respectively. Hence, the four transistors serve to combine the two off-axis correction voltages at output terminals $p_y$ and $q_y$ which in turn are coupled to bases 139 and 116, respectively, of transistors 137 and 117, respectively. These output transistors are also in a complementary-symmetry configuration with their outputs taken at their collectors 136 and 135, respectively, which are points $q_x$ and $p_x$, respectively. Hence, points $p_y$ and $q_y$ are coupled from combining network 23 of FIG. 4 to the $y$-on axis matrix 21, which are shown in FIG. 7 as points $p$ and $q$. Points $p_x$ and $q_x$ are coupled to points on the $x$-on axis matrix 18 of FIG. 4 from combining network 23, shown as points $p$ and $q$ in FIG. 7.

The cathode ray tube deflection geometry distortion has thus been obviated by the on-axis matrices, and the off-axis distortion introduced thereto has been obviated by the off-axis matrices together with an appropriate combining network to off-set the non-linearity due to the interaction of the two deflection axes.

It should be understood, of course, that the foregoing disclosure relates to only a preferred embodiment of the invention and that it is intended to cover all changes and modifications of the example of the invention herein shown for the purposes of the disclosure which do not constitute departures from the spirit and scope of the invention.

What is claimed is:

1. A raster linearity correction generator for compensating $x$-axis and $y$ axis ramp signals for distortion due to wide angle cathode ray tube deflection comprising:

an $x$ on-axis correction matrix for correcting $x$ axis sweep non-linearity due to cathode ray tube geometry, said $x$ on-axis matrix having first and second inputs and an output, said first input being connected to an $x$ axis ramp signal means;

a $y$ on-axis correction matrix for correcting $y$ axis sweep non-linearity due to cathode ray tube geometry, said $y$ on-axis matrix having first and second inputs and an output, said first input being connected to $y$ axis ramp signal means;

an $x$ off-axis correction matrix for generating a signal in proportion to said $y$ axis ramp signal, said $x$ off-axis matrix having an input being connected to said $y$ axis ramp signal means and an output;

a $y$ off-axis correction matrix for generating a signal in proportion to said $y$ axis sweep, said $y$ off-axis matrix having an input being connected to said $x$ axis ramp signal means and an output;

a combining means, said combining means having first and second inputs connected to said $x$ off-axis output and said $y$ off-axis output, respectively, and said combining means having first and second outputs connected to said $x$ on-axis matrix second input and said $y$ on-axis matrix second input, respectively;

whereby, said $x$ on-axis matrix output and said $y$ on-axis matrix output are fully compensated for distortion due to wide angle cathode ray tube deflection.

2. The raster linearity correction generator of claim 1 wherein; each of said correction matrices comprise a plurality of paralleled biased diodes.

3. The raster linearity correction generator of claim 1 wherein; said combining network comprises four transistors in serial relationship.

4. The raster linearity correction generator of claim 3 wherein; said transistors are connected in a complementary symmetry configuration.

5. The raster linearity correction generator of claim 2 wherein; the on-axis matrices bias is supplied by the outputs from said combining network.

References Cited by the Examiner

UNITED STATES PATENTS

| | | | |
|---|---|---|---|
| 2,842,709 | 7/58 | Lufkin | 315—24 |
| 2,869,026 | 1/59 | Sanford | 315—24 |
| 3,147,397 | 9/64 | Michaelson | 307—88.5 |

OTHER REFERENCES

IBM Technical Disclosure Bulletin, CRT Pin Cushioning Correction Circuit by Koelsch, vol. 5, No. 10, March 1963.

ARTHUR GAUSS, *Primary Examiner.*